Feb. 17, 1942.  W. ROWERDINK  2,273,331
FLOWMETER
Filed Oct. 8, 1938
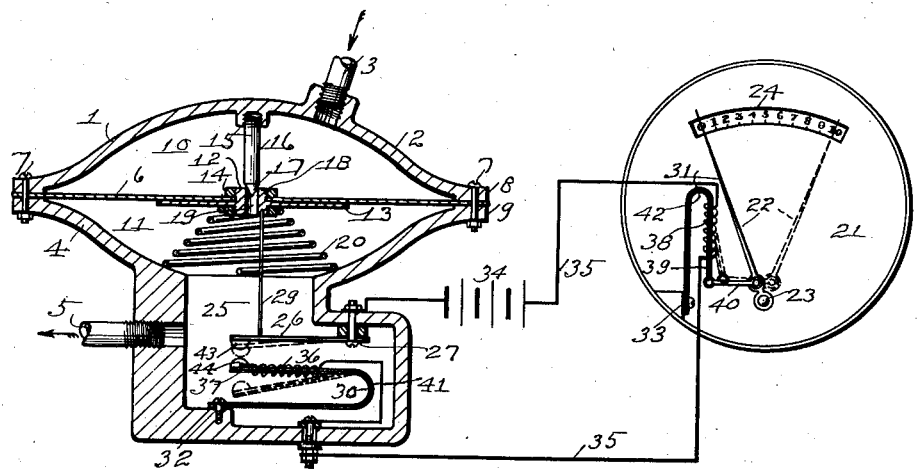
INVENTOR.
William Rowerdink
BY
Rice and Rice
ATTORNEYS.
Witness:
John S. Braddock Patented Feb. 17, 1942

2,273,331

UNITED STATES PATENT OFFICE 2,273,331

FLOWMETER

William Rowerdink, East Grand Rapids, Mich.

Application October 8, 1938, Serial No. 233,947

2 Claims. (Cl. 73—210)

The present invention relates to flow meters; and its object is, generally, to provide an improved instrument of that character whereby the flow of fluids and the fluctuations thereof may be accurately and constantly metered and indicated; and particularly, to provide such a meter comprising a flow indicator and electric means governed by fluid pressures exerted by the flow in the fluid line for controlling the indicator; and further, to provide such a meter of small size and simple design which shall be inexpensive to manufacture and capable of metering and indicating very slight, as well as heavy, fluid flow in the line; and further, to provide such a meter wherein mechanical parts heretofore employed in such meters are, with their bearings, etc., dispensed with thus minimizing friction and eliminating obstructions on which foreign matter in the fluid may lodge, so that my meter's operation is made more steady and uniform and the fluid flow more accurately indicated.

This and any other and more specific objects hereinafter appearing are attained by, and the invention finds preferable embodiment in, the illustrative structures and devices, mechanical and electrical, hereinafter particularly described in the body of this specification and illustrated by the accompanying drawing, in which the drawing is a view of one form of my flow meter, certain parts being shown in central section, and its indicator shown in elevation, with electrical connections therebetween containing electrical instruments shown somewhat diagrammatically.

In the line of the flow of the fluid a valve structure is provided contained, as shown in a hollow body 1 comprising a cup-shaped member 2 into which the flowing fluid enters through an intake 3 and a cup-shaped member 4 from which the fluid passes through an outlet 5.

The illustrated valve structure comprises a diaphragm 6 clamped by bolts 7 between the peripheral flanges 8, 9 of said members, thus dividing the space in the body into chambers 10, 11. The diaphragm has an opening containing the hollow valve seat member 12 having a radial flange 13 engaging the diaphragm's under side and a nut 14 threaded on this member's upper end for sealingly clamping the diaphragm on said flange. Fastened at 15 to the inner side of the upper member 2, the valve stem 16 extends inwardly (downwardly) and has a conical valve portion 17 cooperating with the valve seat 18 of member 12 to progressively open the fluid passage 19 therethrough as the fluid pressure in the upper chamber 10 increases, and to a less degree as such pressure decreases.

The diaphragm being flexible is desirably resilient for yieldingly flexing to move the valve seat toward valve-seating position, but independent or additional means for thus flexing the diaphragm are provided by the conically spiral spring 20 pressing between the diaphragm (i. e. the member 12) and the inner (upper) side of the body's member 4.

The indicator 21 has a pointer 22 pivoted at 23 and a graduated scale 24 for indicating the fluid flow and fluctuations therein.

A rod or link 29 extends between the diaphragm (i. e. the member 12) and a movable conductor arm of suitable electric means for controlling the indicator by fluid pressures exerted by the fluid flow in the line.

Thermostatic bi-metal bars 30, 31 are mounted at 32 below conductor spring 26 in the body 1 and at 33 in the indicator 21 respectively. An electric circuit includes said conductor arm 26, a battery 34, and the wire 35 which is coiled at 36 around the free arm 37 of bar 30 and around the free arm 39 of bar 31 for heating said free arms by said coiled portions' resistance to the current passing therethrough, the coiled portion 36 being connected to the contact point 44 carried by the free arm 37 or bar 30.

The free arm 39 of the bar 31 is connected by a link 40 with the indicator's pointer 22 for turning the pointer toward the right hand end of the scale by the expanding or straightening flexing of this bar (i. e. the movement of its free arm toward its position indicated in broken lines), caused by the heating action of the wire's coiled portion 38.

The flexing of the other bar 30 under heat is opposite to that of bar 31, this bar 30 contracting when heated thus moving its free arm 37 downwardly, toward its position shown in broken lines and from the movable conductor arm 26 (which in this form of said electric means is a spring arm mounted at 27) of a circuit opening and closing switch in said electric circuit. To effect this different flexing of said bars, the outer (more convex) layer 41 of bar 30 and the inner (more concave) layer 42 of bar 31 are of metal more responsive to the expanding action of heat than are the other layers of these bi-metal bars.

The heating and cooling of the thermostatic bars 30, 31 are so slow that, although slight changes in fluid flow are accurately and constantly indicated by the pointer which is very sensitive thereto, the movements of this pointer are made more steady by these thermostatic bars.

The action of the meter is as follows. As the fluid pressure in chamber 10 increases the diaphragm is thereby flexed downwardly to increasingly open the fluid passage 19, and the rod 29 flexes the conductor spring arm 26 downwardly toward its position shown in broken lines causing its contact point 43 to contact the contact point 44 of the wire's coiled portion 36 carried by the free (upper) arm 37 of the thermostatic bar 30, thus closing the electric circuit so that the wire's coiled portion 38 heats the free arm 39 of the bar 31 and thereby turns the pointer toward the right hand end of the scale 24 of the indicator 21 to indicate increased flow of the fluid. If the flow through passage 19 be now constant, the positions of the diaphragm and of the conductor spring arm 26 remain unchanged; but when the heating of the wire's coiled portion 36 flexes said free arm 37 downwardly toward its broken line position, sufficiently to separate the contact points 43, 44 and thus open the circuit, this free arm 37 cools and flexes upwardly, so that the points 43, 44 again contact thus again moving the pointer to increasing flow indicating position. The points 43, 44 thus contact and separate intermittently, and frequently with considerable rapidity, for actuating the pointer to indicate the fluid flow.

The invention being intended to be pointed out in the claims, is not to be limited to or by details of construction and arrangement of any particular embodiment thereof illustrated by the drawing or hereinbefore described.

I claim:

1. A flow meter of the class described comprising, in combination: an indicator having a turnable pointer; a hollow body in the fluid line having a flexible diaphragm extending thereacross with a medial opening and a valve seat therein, and having a valve stem with a conical valve end seating in the valve seat, the diaphragm being movable toward valve-opening position by fluid pressure in the line; a bi-metal thermostatic bar connected with the pointer; a second bi-metal thermostatic bar; an electric circuit comprising portions coiled around said bars respectively for heating and thereby flexing the same by the resistance of said coiled portions to the current passing therethrough, the first bar thus flexed turning the pointer to indicate increased fluid flow, the circuit including a contact carried by the second bar and a switch having an arm connected with the diaphragm and movable by increased fluid pressure into circuit-closing engagement with said contact for alternately energizing the circuit's resistance portion coiled around the first bar thereby flexing the same to turn the pointer for indicating such increased flow, and energizing the circuit's resistance portion coiled around the second bar thereby flexing the same to separate said contact from the switch arm.

2. A flow meter of the class described comprising, in combination: an indicator having a movable flow-indicating pointer; a valve structure in the fluid line comprising a stationary valve stem and a flexible diaphragm extending across the line and having a medial fluid opening therethrough with a seat for the valve stem, the diaphragm being movable toward valve-opening position by fluid pressure in the line; a bi-metal thermostatic bar connected with the pointer; a second bi-metal thermostatic bar; an electric circuit comprising portions coiled around said bars respectively for heating and thereby flexing the same by the resistance of said coiled portions to the current passing therethrough, the first bar thus flexed turning the pointer to indicate increased fluid flow, the circuit including a contact carried by the second bar and a switch having an arm connected with the diaphragm and movable by increased fluid pressure into circuit-closing engagement with said contact for alternately energizing the circuit's resistance portion coiled around the first bar thereby flexing the same to turn the pointer for indicating such increased flow, and energizing the circuit's resistance portion coiled around the second bar thereby flexing the same to separate said contact from the switch arm.

WILLIAM ROWERDINK.